(12) United States Patent
Collings et al.

(10) Patent No.: US 9,274,400 B2
(45) Date of Patent: Mar. 1, 2016

(54) OPTICAL BEAM STEERING

(75) Inventors: Neil Collings, Linton (GB); William Crossland, Harlow (GB); Maura Michelle Redmond, Cambridge (GB); John Richard Moore, Cambridge (GB); David Nugent, Cambridge (GB); Brian Robertson, Cambridge (GB)

(73) Assignee: Cambridge Enterprise Limited, University of Cambridge, Cambridge, Cambridgeshire (GB)

( * ) Notice: Subject to any disclaimer, the term of this patent is extended or adjusted under 35 U.S.C. 154(b) by 719 days.

(21) Appl. No.: 13/129,029

(22) PCT Filed: Nov. 13, 2009

(86) PCT No.: PCT/GB2009/051536
§ 371 (c)(1),
(2), (4) Date: Aug. 1, 2011

(87) PCT Pub. No.: WO2010/055350
PCT Pub. Date: May 20, 2010

(65) Prior Publication Data
US 2011/0273657 A1 Nov. 10, 2011

(30) Foreign Application Priority Data
Nov. 14, 2008 (GB) .................................. 0820872.0

(51) Int. Cl.
*G02F 1/29* (2006.01)
*G02F 1/31* (2006.01)
(Continued)

(52) U.S. Cl.
CPC *G02F 1/31* (2013.01); *G02F 1/292* (2013.01); *G02F 1/1393* (2013.01); *G02F 1/136277* (2013.01); *G02F 2001/13355* (2013.01); *G02F 2203/06* (2013.01); *G02F 2203/585* (2013.01)

(58) Field of Classification Search
CPC ........................... G02F 1/292; G02F 2203/585
See application file for complete search history.

(56) References Cited

U.S. PATENT DOCUMENTS 5,111,321 A * 5/1992 Patel .............................. 349/198
5,363,228 A 11/1994 DeJule et al.
(Continued)

FOREIGN PATENT DOCUMENTS

| CN | 1727966 A | 2/2006 |
|---|---|---|
| CN | 101023391 A | 8/2007 |

(Continued)

OTHER PUBLICATIONS

Cohen, et al., "100-GHz-Resolution Dynamic Holographic Channel Management for WDM", "IEEE Photonics Technology Letters", Jul. 1999, pp. 851-853, vol. 11, No. 7, Publisher: IEEE, Published in: US.
(Continued)

*Primary Examiner* — Jessica M Merlin
(74) *Attorney, Agent, or Firm* — Loginov & Associates, PLLC; William A. Loginov

(57) ABSTRACT

The invention relates to optical beam steering. There is described an optical beam steering apparatus, comprising: a splitter arranged to split an optical beam into at least a first part having a first polarization and a second part having a second polarization, said first and second polarizations being substantially mutually orthogonal; a first liquid crystal device region arranged to receive said first part and to have director orientation substantially aligned to said first polarization; and a second liquid crystal device region arranged to receive said second part and to have director orientation substantially aligned to said second polarization.

7 Claims, 4 Drawing Sheets

(51) Int. Cl.
*G02F 1/1362* (2006.01)
*G02F 1/139* (2006.01)
*G02F 1/1335* (2006.01)

(56) References Cited

U.S. PATENT DOCUMENTS

| | | | |
|---|---|---|---|
| 5,825,448 | A | 10/1998 | Bos et al. |
| 6,185,023 | B1 * | 2/2001 | Mizrahi ............................ 398/9 |
| 6,760,149 | B2 | 7/2004 | Roberts et al. |
| 6,807,371 | B1 | 10/2004 | Abakoumov et al. |
| 2003/0161567 | A1 | 8/2003 | Baxter et al. |
| 2003/0194165 | A1 * | 10/2003 | Silberberg et al. ............. 385/11 |
| 2003/0210727 | A1 | 11/2003 | Frisken et al. |
| 2005/0276537 | A1 | 12/2005 | Frisken |
| 2007/0206151 | A1 * | 9/2007 | Sakai et al. .................. 349/187 |
| 2008/0260394 | A1 * | 10/2008 | Ereifej .......................... 398/159 |

FOREIGN PATENT DOCUMENTS

| | | |
|---|---|---|
| CN | 201149637 Y | 12/2007 |
| GB | 2330422 A | 4/1999 |
| JP | 03150525 A | 11/1989 |
| JP | 2005-522731 A | 7/2005 |
| WO | 03087902 A2 | 10/2003 |
| WO | WO 2005047942 A1 | 5/2005 |
| WO | 2005059881 A2 | 6/2005 |
| WO | WO 2006034533 A1 | 4/2006 |
| WO | WO 2006047834 A1 | 5/2006 |
| WO | 2010055350 A1 | 5/2010 |

OTHER PUBLICATIONS

Lelah, et al., "A CMOS VLSI Pilot and Support Chip for a Liquid Crystal on Silicon 8X8 Optical Cross-Connect", "Wave Optics and VLSI Photonic Devices for Information Processing", 2001, pp. 173-183, vol. 4435, Publisher: SPIE, Published in: US.

Ertel, et al., "Design and Perofrmance of a Reconfigurable Liquid-Crystal-Based Optical Add/Drop Multiplexer", "Journal of Lightwave Technology", Apr. 2006, pp. 1674-1680, vol. 24, No. 4, Publisher: IEEE, Published in: US.

Fracasso, et al., "Design and Performance of a Versatile Holographic Liquid-Crystal Wavelength-Selective Optical Switch", "Journal of Lightwave Technology", Oct. 2003, pp. 2405-2411, vol. 21, No. 10, Publisher: IEEE, Published in: US.

Parker, et al., "Dynamic Digital Holographic Wavelength Filtering", "Journal of Lighwave Technology", Jul. 1998, pp. 1259-1270, vol. 16, No. 7, Publisher: IEEE, Published in: US.

Ahderom, et al., "Dynamic WDM Equalizer Using Opto-VLSI Beam Processing", "IEEE Photonics Technology Letters", Nov. 2003, pp. 1603-1605, vol. 15, No. 11, Publisher: IEEE, Published in: US.

Roth, et al., "Large-Aperture Wide Field of View Optical Circulators", "IEEE Photonics Technology Letters", Oct. 2005, pp. 2128-2130, vol. 17, No. 10, Publisher: IEEE, Published in: US.

Barge, et al., "A Polymer-Dispersed Liquid Crystal-Based Dynamic Gain Equalizer", "Journal of Lightwave Technology", Aug. 2005, pp. 2531-2541, vol. 23, No. 8, Publisher: IEEE, Published in: US.

Wilkinson, et al., "Reconfigurable Free-Space Optical Cores for Storage Area Networks", "IEEE Communications Magazine", Mar. 2005, pp. 93-99, Publisher: IEEE, Published in: US.

Cao, et al., "Reflective Liquid Crystal Wavefront Corrector Used With Tilt Incidence", "Applied Optics", Apr. 10, 2008, pp. 1785-1789, vol. 47, No. 11, Publisher: Optical Society of America, Published in: US.

Moore, et al., "The Silicon Backplane Design for an LCOS Polarization-Insenstive Phase Hologram SLM", "IEEE Photonics Technology Letters", Jan. 1, 2008, pp. 60-63, vol. 20, No. 1, Publisher: IEEE, Published in: US.

* cited by examiner

OPTICAL BEAM STEERING

FIELD OF THE INVENTION

The invention generally relates to optical beam steering apparatuses, an optical add drop multiplexer comprising an optical beam steering apparatus, a liquid crystal device for optical beam steering, and a method of manufacturing a liquid crystal device for optical beam steering. More particularly, the invention may relate to a polarisation diversity reconfigurable optical add drop multiplexer (ROADM).

BACKGROUND TO THE INVENTION

Within telecoms communication systems, light entering an input port of a device may have any possible polarisation state and this may be time varying. If such light is routed through a device, it is preferable that the light that appears in the output port has an amplitude, which does not depend on the input polarisation state.

In order to allow operation with modulated signals, a device or system preferably 'honours' polarisation, i.e., paths of beams of different polarisation are matched in order to allow operation without disturbance of relative polarisation between the beams of different polarisation. For example, polarisation insensitive phase modulation may ensure that the intensity of steered or routed output beams are substantially unaffected by the polarisation state of the input beam. More particularly, polarisation insensitive phase modulation may provide a known, minimal and/or time independent insertion loss.

An optical device or system may use Liquid Crystals (LC). The liquid crystalline molecules in a material exhibiting a nematic or ferroelectric LC phase are typically rod shaped. The direction of preferred orientation of such LC molecules in the neighbourhood of any point can be represented by n (a dimensionless unit vector), where n and −n are fully equivalent. In other words, an LC device has a liquid crystal director that can be regarded as an arrow, which indicates the average preferred orientation of liquid crystalline molecules in a liquid crystal material. Both directions (180 degrees apart) of the arrow are equivalent.

Ferroelectric liquid crystalline (Sc*) materials switch largely in the plane of a Liquid-Crystal-on-Silicon (LCOS) device. When an electric field is applied to such a device, the director changes its orientation in the plane of the device. An array of pixels switched such that one of two opposite positions are taken around the director cone produces (under certain conditions) an array with binary phase levels 0 and pi. Such a binary phase array produces diffraction peaks in the device output plane that include both the first order (routing) peak and unwanted higher and symmetric orders which results in power loss and potential crosstalk. The loss of a device using this effect will not depend on the input polarisation state, i.e. it is polarisation insensitive, but will depend on the LC layer thickness and the switching angle.

LC may be provided in a Liquid-Crystal-on-Silicon (LCOS) device having the liquid crystalline material on a silicon substrate that is coated with a reflective layer. LC applied to such a reflective substrate may be controllable to allow light to be reflected or blocked. Specifically, a LCOS may comprise a silicon CMOS chip having a reflective coating (e.g., comprising aluminium) that is covered with LC, and a glass layer over the LC.

The field of optical beam steering continues to provide a need for improvements such as, for example, reduced insertion loss and/or polarisation insensitivity.

For use in understanding the present invention, the following disclosures are referred to:

"High information-content projection display based on reflective LC-on-silicon light valves", R. L. Melcher, M. Ohhata, K. Enami, J. SID 6 Apr. 1998 p. 253-256).

"Semiconductor manufacturing techniques for ferroelectric liquid crystal microdisplays", M. Handschy, Solid State Technology May 2000, 151-161.

"The Silicon Backplane Design for an LCOS Polarization-Insensitive Phase Hologram SLM", Moore, J. R.; Collings, N.; Crossland et al.; IEEE Photonics Technology Letters, vol. 20, Issue 1, Jan. 1, 2008 Page(s):60-62.

J. Ertel et al "Design and performance of a reconfigurable liquid crystal based optical add/drop multiplexer", JLT 24(4) (2006) pp. 1674-80.

J. M. Roth et al., "Large-aperture wide field of view optical circulators", IEEE PTL 17(10) (2005) pp. 2128-30.

U.S. Pat. No. 6,760,149 "Compensation of Polarisation Dependent Loss", 8 Jul. 2002, Nortel Networks LTD U.S. Pat. No. 6,807,371 "Reconfigurable Add-Drop Multiplexer", 27 Nov. 2000, Nortel Networks LTD US 2003/0161567 "Tunable Wavelength Multiplexer", 28 Feb. 2002, Engana PTY LTD US 2003/0210727 "Narrowband Filter Method and Apparatus", 7 May 2002, Engana PTY LTD U.S. Pat. No. 7,092,599 "Wavelength Manipulation System and Method", 12 Nov. 2003, Engana PTY LTD US 2005/0100277 "Wavelength Manipulation System and Method", 12 Nov. 2003, Engana PTY LTD US 2005/0276537 "Dual-Source Optical Wavelength Processor", 14 Jun. 2004, Engana PTY LTD WO 2006/034533 "Wavelength Selective Reconfigurable Optical Cross-connect", 23 Sep. 2005, Engana PTY LTD WO 2006/047834 "Optical Calibration System and Method", 8 Nov. 2004, Engana PTY LTD.

Dynamic digital holographic wavelength filtering; Parker, M. C. Cohen, A. D. Mears, R. J.; Fujitsu Telecommun. Europe Ltd. Res., Colchester; Journal of Lightwave Technology, Publication Date: July 1998, Volume: 16, Issue 7, page(s): 1259-1270

Holographic optical switching: the "ROSES" demonstrator; Crossland, W. A., Manolis, I. G., Redmond, M. M. et al.; Journal of Lightwave Technology, 18 (12). pp. 1845-1854. ISSN 0733-8724

100-GHz-resolution dynamic holographic channel management for WDM; Cohen, A. D.; Parker, M. C.; Mears, R. J. IEEE Photonics Technology Letters, Volume 11, Issue 7, July 1999 Page(s):851-853

Design and performance of a versatile holographic liquid-crystal wavelength-selective optical switch; Fracasso, B.; de Bougrenet de la Tocnaye, J. L.; Razzak, M.; Uche, C.; Journal of Lightwave Technology, Volume 21, Issue 10, October 2003 Page(s): 2405-2411

A polymer-dispersed liquid crystal-based dynamic gain equalizer; Barge, M.; Battarel, D.; de la Tocnaye, J. Ld. B.; Journal of Lightwave Technology, Volume 23, Issue 8, August 2005 Page(s): 2531-2541

Reconfigurable free-space optical cores for storage area networks Wilkinson, T. D.; Crossland, B.; Collings, N.; Fan Zhang; Fan, M.; IEEE Communications Magazine, Volume 43, Issue 3, March 2005 Page(s): 93-99

Dynamic WDM equalizer using opto-VLSI beam processing; S. Ahderom; M. Raisi; K. E. Alameh; K. Eshraghian; IEEE Photonics Technology Letters, Volume 15, Issue 11, November 2003 Page(s):1603-1605

Dynamic holographic spectral equalization for WDM; M. C. Parker; A. D. Cohen; R. J. Mears; IEEE Photonics Technology Letters, Volume 9, Issue 4, April 1997 Page(s):529-531

US2002131702 "Combined multiplexer and demultiplexer for optical communication systems", Morey William W; Chen Ray T; Fluisar Corporation.

US2004136071 "Diffractive optics assembly in an optical signal multiplexer/demultiplexer", Morey William W; Deng Xuegong; Chen Ray T.

Reflective liquid crystal wavefront corrector used with tilt incidence; Zhaoliang Cao, Quanquan Mu, et al., Applied Optics, Vol. 47, Issue 11, pp. 1785-1789

Design and performance of a reconfigurable liquid-crystal-based optical add/drop multiplexer; Ertel, J.; Helbing, R.; Hoke, C.; Landolt, O.; Nishimura, K.; Robrish, P.; Trutna, R.; Journal of Lightwave Technology; Volume 24, Issue 4, April 2006 Page(s): 1674-1680

Five-channel surface-normal wavelength-division demultiplexer using substrate-guided waves in conjunction with a polymer-based Littrow hologram, Maggie M. Li, Ray T Chen, Optics Letter, 1 Apr. 1995, Vol. 20, No. 7, p. 797

Large-aperture wide field of view optical circulators; Roth, J. M.; Bland, R. E.; Libby, S. I.; IEEE Photonics Technology Letters, Volume 17, Issue 10, October 2005 page(s): 2128-2130

SUMMARY

According to a first aspect of the present invention, there is provided an optical beam steering apparatus, comprising: a splitter arranged to split an optical beam into at least a first part having a first polarisation and a second part having a second polarisation, said first and second polarisations being substantially mutually orthogonal; a first liquid crystal device region arranged to receive said first part and to have director orientation substantially aligned to said first polarisation; and a second liquid crystal device region arranged to receive said second part and to have director orientation substantially aligned to said second polarisation.

The first and second liquid crystal device regions may be integral to a single liquid-crystal-on-silicon (LCOS) element or device or may be provided within separate LCOS devices. Furthermore, one of both of those regions may comprise nematic liquid crystal.

The liquid crystal device area of the device/element may be segmented into two, three or more integral regions, with neighbouring regions having mutually orthogonal director orientations. More precisely, the single LCOS device/element may comprise a plurality of LC regions integral to the device/element, the plurality comprising the above first and second LC regions and at least one further LC region, each of the regions arranged adjacent at least one other of the regions, wherein the regions of each pair of adjacent regions have mutually orthogonal director orientations. For example, the regions may be arranged as a row of regions of alternating director orientation, or as an array wherein the director orientations alternate in a manner aking to a chequerboard. The adjacent regions may be directly adjacent.

The optical beam steering apparatus may further comprise at least one wide aperture optical circulator, the circulator allowing light to be transmitted to said splitter and received from the splitter.

In a further aspect, there is provided an optical add drop multiplexer comprising the optical beam steering apparatus described above. Thus, the above optical beam steering apparatus may be implemented within an optical add drop multiplexer (OADM) such as a reconfigurable OADM (ROADM). (Any reference herein to OADM encompasses an ROADM). For example, the or each LCOS of an embodiment of the present invention implemented within a ROADM may be remotely controllable by electrical signals. An OADM may be scaled to have, e.g., 40-80 ports, involving a plurality of implementations of the present invention.

According to a second aspect of the present invention, there is provided a liquid crystal device for optical beam steering, comprising: a first liquid crystal region; and a second liquid crystal region, wherein said first and second regions have substantially mutually orthogonal director orientations.

Such a device may provide an element for conveniently implementing polarisation insensitive optical beam processing in a variety of applications such as, e.g., optical beam steering such as in an OADM or in visual display equipment, in particular where a beam is split into mutually orthogonal polarisations.

The first and second regions of the device may be integral to a single LCOS or may be provided within separate, respective LCOS devices. Furthermore, one or both of those regions may comprise nematic liquid crystal.

At least one of the first and second liquid crystal regions of the device may comprise a layer of material on LCOS, the layer being for determining director orientation. A suitable material may be an oxide of silicon, e.g., $SiO_2$.

A plurality of the above-described devices may be implemented in may. In other words, a matrix or array of the devices, each device having the first and second liquid crystal regions, may be provided within a single optical beam steering apparatus.

According to a third aspect of the present invention, there is provided a method of manufacturing a liquid crystal device for optical beam steering, the liquid crystal having a first region having a first director orientation and a second region having a second director orientation, the method comprising: a step of treating said first liquid crystal region of said device to have said first director orientation, wherein said first orientation is substantially mutually orthogonal to said second director orientation of said second region of said device.

The method may further comprise a second step of treating the second liquid crystal region of said device to have said second director orientation. Whether or not this second step is necessary may depend on whether or not the original LC has a known director orientation.

One or both of said first and second steps may comprise at least one of deposition of a material layer (e.g., of a SiOx or $SiO_2$, as described above), rubbing or photoalignment. For example, the deposition may be followed by rubbing or photoalignment. In more detail, the deposition may involve evaporation, printing or spin coating, and the material layer may be deposited on top of the reflective coating of a LCOS.

According to a fourth aspect of the present invention, there is provided an optical beam steering apparatus, comprising: a splitter arranged to split a beam into at least a first part having a first polarisation and a second part having a second polarisation, said first and second polarisations being substantially mutually orthogonal; a first liquid crystal device region having a first director orientation and a first surface area that is arranged to receive said first part; and a second liquid crystal device region having a second director orientation and a second surface area that is arranged to receive said second part, wherein said first liquid crystal device region is arranged such that polarisation of said first part when incident on said first surface area is at a first angle relative to said first director orientation, said second liquid crystal device region is arranged such that polarisation of said second part when incident on said second surface area is at a second angle relative to said second director orientation, and one of said first and second angles is substantially +45 degrees and the other of said angles is substantially −45 degrees.

Thus, for example, a beam may be split into two mutually orthogonal parts that are incident in parallel on a single LCOS having a single director orientation. A plane parallel to the director orientation and normal to the device plane may bisect the substantially 90 degree angle defined by the mutually orthogonal beam parts when these parts are incident on the LCOS. The effective refractive index experienced by either of the two incident beams may depend on the relative orientation of the electric field vector (determined by the polarisation state) of that beam and the optical indicatrix of the aligned LC material within the device. A projection of the director onto the plane of the LCOS device may be +45 degrees from the polarisation of the first incident beam part, and a projection of the director onto the plane of the LCOS device part may be −45 degrees from the polarisation of the incident second beam part.

Thus, an embodiment may be arranged such that one of the first and second angles is substantially +45 degrees and the other of said angles is substantially −45 degrees. Furthermore, while it is advantageous that the angles are equal in magnitude, it may not be necessary that this magnitude is exactly 45 degrees even if such an angle may result in minimum insertion loss.

The first and second liquid crystal regions orientations of the apparatus according to the fourth aspect may comprise nematic liquid crystal. Thus, characteristics of nematic LC such as switching out of the plane of the LC device may be exploited to allow analog phase control and reduced insertion loss.

Furthermore, the first and second director orientations of those regions may be substantially aligned to one another. This is especially the case if, for example, the first and second liquid crystal regions are integral to a single LCOS.

The apparatus of the fourth aspect may further comprise at least one wide aperture optical circulator, which is arranged to transmit light to, and receive light from, the splitter. This may be particularly advantageous if the apparatus is used in a scaled device that has a high density of optical beam steering components corresponding to a plurality of (e.g., 80) wavelength ports in a wavelength division multiplexing (WDM) system.

According to a fifth aspect of the invention, there is provided a Method of optical beam steering, comprising: splitting a beam into at least a first part having a first polarisation and a second part having a second polarisation, said first and second polarisations being substantially mutually orthogonal; transmitting said first part such that polarisation of said first part when incident on a first surface area is at a first angle relative to a first director orientation, a first liquid crystal device region having said first director orientation and said first surface area, transmitting said second part such that polarisation of said second part when incident on a second surface area is at a second angle relative to a second director orientation, a second liquid crystal device region having said second director orientation and said second surface area, wherein said first and second angles are substantially equal in magnitude.

In the fifth aspect, the first and second angles may be opposite in sign. More particularly, one of the first and second angles may be substantially +45 degrees while the other angle is substantially −45 degrees.

According to further aspects, the present invention provides corresponding methods to each of the apparatuses and devices described above, and apparatuses made according to the above described methods, and systems comprising the above apparatuses or devices, or which are implemented using the above method.

Preferred embodiments are defined in the appended dependent claims.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION

Figure 1:
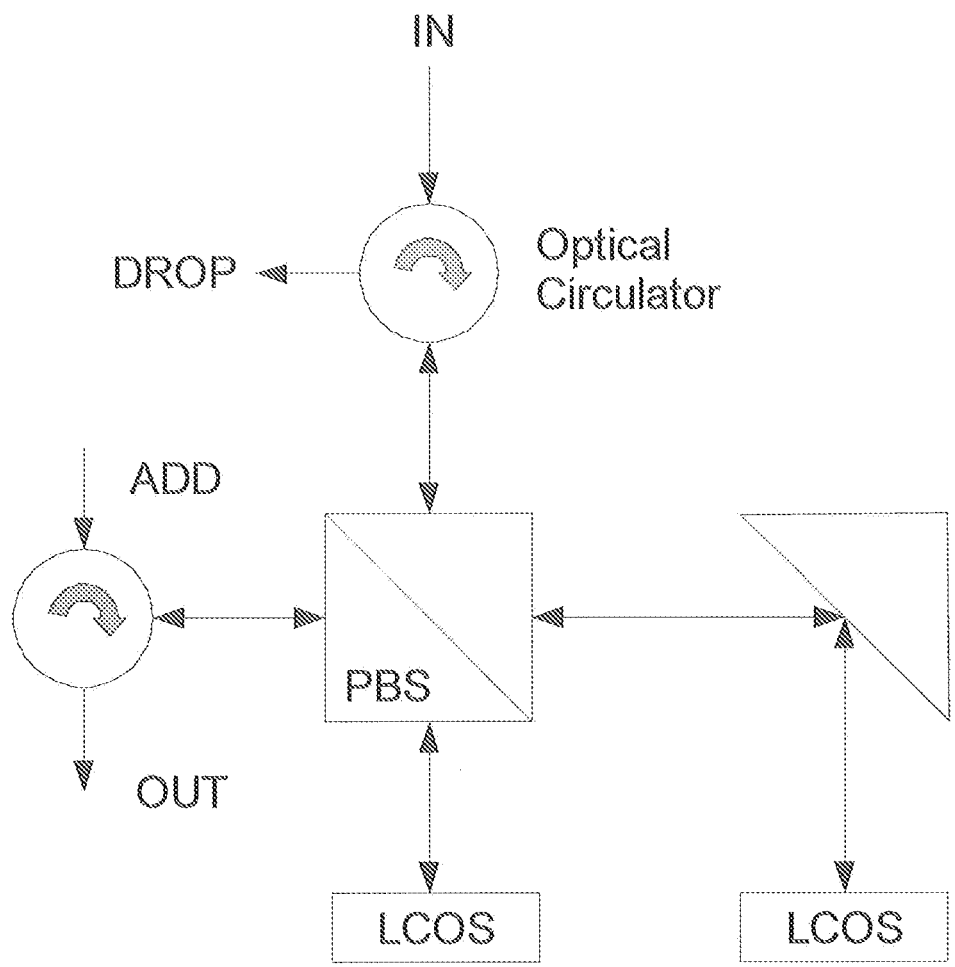
FIG. 1 shows a first embodiment employing a two LCOS approach.

The embodiments described herein are suitable for optical beam steering. Such steering may include, for example, selective wavelength switching such as in an optical add drop multiplexer.

Polarisation of any of the light beams in any implementation of any embodiment of the present invention may be at any point on the Poincare sphere, e.g., may be linear or circular.

In any of the embodiments described below, the input light may be split (e.g., using a Polarisation Beam Splitter (PBS)) into two mutually orthogonal components which then take separate paths in space until switching has been performed on the components. In other words, the components may not be recombined before switching. Since, in general, no matter what the input polarisation state is, it can always be represented by two mutually orthogonal linear polarisation states, separating the incident light into two components in this way may thus imply no theoretical loss. If the polarisation of the incoming beam changes this may simply couple light in a different proportion between the two incident beams, i.e., one beam's loss is the other beam's gain. If both beams see the same phase modulation (which phase modulation may route the beams to the output port), the device may then be polarisation insensitive. Thus, any of the embodiments described herein may provide a method of polarisation insensitive phase modulation.

In embodiments of the present invention, polarisation insensitivity may be improved by the following:

(a) rotating the director (rather than the polarisation direction) within two different regions of the same device or between two devices so that both beams of light see the same refractive index profile. Thus, the LCOS may be split into two regions with substantially orthogonal director orientations. This may be achieved by depositing a material layer such as SiOx (e.g., $SiO_2$), and the deposition may be followed by rubbing or by photoalignment techniques, for example. The deposition may involve evaporation, printing or spin coating. The material layer may be deposited on top of the reflective coating of the LCOS.

(b) the two components are oriented so that their polarisation states form the same non-zero angle (e.g., substantially 45 degrees; the angles may be opposite in sign) with respect to the director. For example, LCOS is provided that is split into two regions but has the same director orientation throughout. The two regions may be provided within one LCOS or separate, respective LCOSs. The orientation of the two input polarisation states may be fixed so that they strike at either side of the director at an angle of substantially 45 degrees.

A single LCOS approach may reduce costs in a scaled device, e.g., an OADM having, e.g., 40-80 ports.

Unwanted orders, loss and crosstalk may be reduced if more phase levels are available. However, this is difficult to achieve using LC materials which switch in the plane of the device. Further phase levels are possible if the director tilts into the device. In this case, polarisation insensitive phase modulation may not be guaranteed and steps may need to be taken to ensure polarisation insensitive operation. One idea might be to introduce a quarter wave plate. Particularly advantageously, the present invention according to any of the herein described embodiments uses nematic liquid crystal.

Nematic Liquid Crystal (LC) materials may switch out of the plane of the LC device. Thus, when the director of such nematic LC is not aligned to the polarisation of a beam, the beam sees the ordinary refractive index of the LC (n⊥). Moreover, an electric field applied to a Nematic LC may tilt the director out of the plane of the device in an analogue manner, so that analogue phase levels are possible. This may, for example, allow a blazed phase profile to be written to the device. Such a phase profile may be used to steer the output beam to an output port without generating second and higher order spots.

However, since nematic LCs are generally optically anisotropic (usually uniaxial), the refractive index experienced by the electric field vector of an incoming ray of light may depend on the electric field vector orientation with respect to the optic axis. In such a case, the LC device is not polarisation insensitive. Therefore, it may be advantageous to employ methods of ensuring polarisation insensitivity. The polarisation states of the incoming beams may be controlled so that both see the same refractive index (preferably n11 to ensure greatest phase depth) ('11' indicates parallel to a director).

A first embodiment of the present invention uses a two LCOS approach, e.g., rotating the director between two devices, each device having a LCOS region, so that both beams of light see the same refractive index profile as in (a) above. Such an embodiment is shown in FIG. 1.

Director rotation in either or both LC regions of the first embodiment (or any other embodiment of the present invention) may be achieved by deposition (e.g. evaporation), which may be followed by rubbing alignment and/or photoalignment. Any of these techniques may make manufacturing easier. In particular, the deposition may involve evaporation, printing or spin coating.

As further shown in FIG. 1, wavelength splitting may be performed prior to the switch. The input light may be separated into two beams with orthogonal polarisation states. Each beam is directed to its own LCOS device. The LCOS devices have substantially mutually orthogonal alignment directions. The polarisation orientation states of the light and the alignment direction within the LCOS are selected to be substantially parallel at each LCOS so that both beams 'see' substantially the full depth of the phase modulation pattern displayed. If both polarisations 'see' substantially the same phase profile, the device may be polarisation insensitive.

If the input beam were not split into two beams of orthogonal polarisation states, the use of an integral quarter wave plate (generally, a birefringent crystal) within a device may be needed to rotate the polarisation state of the input beam on reflection. This may be required to ensure that all polarisation states encounter the same net refractive index profile and hence phase delay on passing through the device. Such a plate may introduce restrictions on device response time or resolution. Thus, the first embodiment may increase the available electric field which can be applied to the LC layer, by not employing a quarter wave plate to ensure polarisation insensitivity. Such a plate may further introduce restrictions on device response time or resolution.

In particular, insertion of a quarter-wave plate within a LCOS structure (e.g., comprising a silicon CMOS pixel, LC and glass) may require the plate to be provided directly over the pixel. This may have side-effects such as a voltage drop across the plate that reduces the voltage to the LC, and/or field spreading.

An embodiment such as that of FIG. 1 may further use a wide aperture optical circulator. A wide aperture circulator may be advantageous where wavelengths from a plurality of channels are to be split, since it may enable losses on any PBS of an embodiment of the present invention to be avoided.

A suitable circulator may be as described in the paper "Large-aperture wide field of view optical circulators", M. Roth et al., IEEE PTL 17(10) (2005) pp. 2128-30. According to the abstract of that paper, a free-space optical circulator for large-aperture directional beam separation at 1.55 µm is described. The devices utilize a magnetless Faraday rotator and polymer true zero-order wave-plate to enable an 11-mm clear aperture, high-power handling up to 100 W/cm², and a ±10° field of view. For a more complete description of a wide aperture circulator that may be used in an embodiment of the present invention, the reader is referred to the entirety of the above paper.

The above embodiment may equally be implemented using a single LCOS treated to have the two LC regions. Similarly, in further embodiments of the present invention, such as shown in FIGS. 2-4, a single or multiple LCOS approach may be used.

Figure 2:
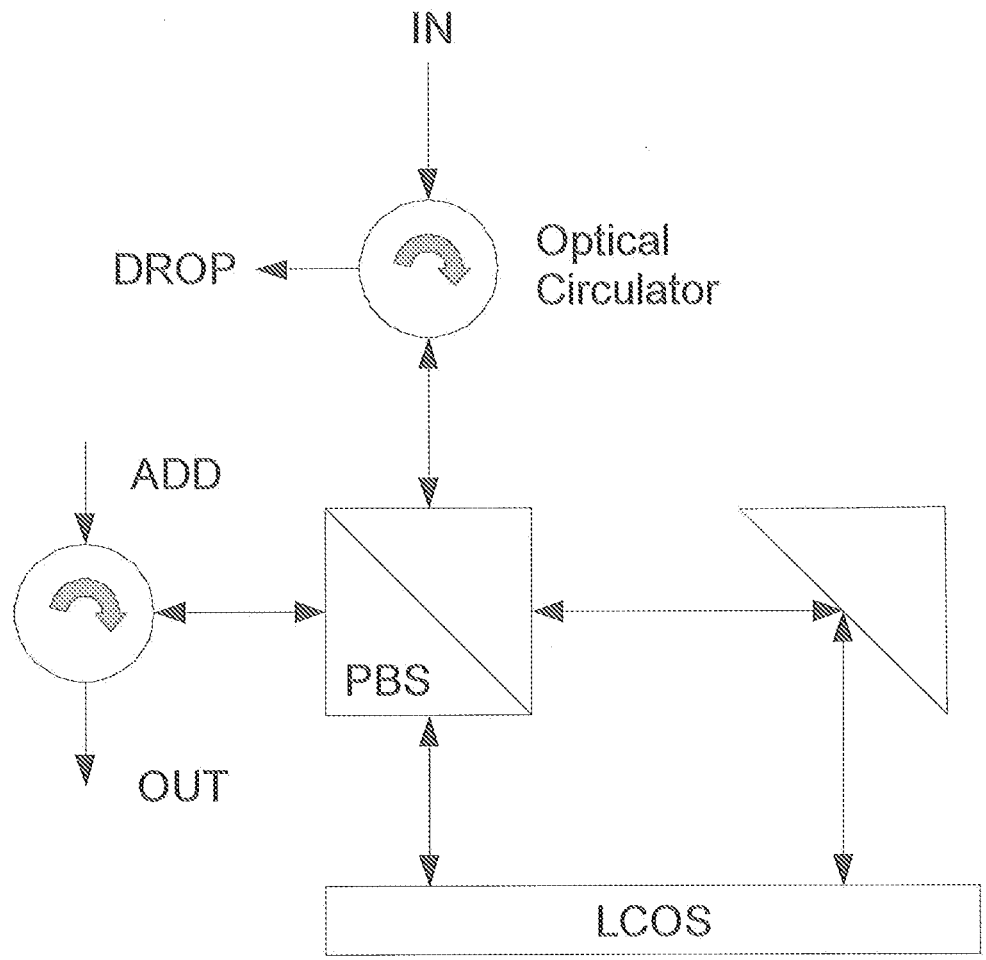
FIG. 2 shows a second embodiment employing a single LCOS approach.

For example, a second embodiment such as is shown in FIG. 2 employs a single LCOS approach. In this case, the LCOS may be split into two regions with orthogonal director orientations, or the LCOS may have the same orientation throughout but the orientations of the two incident polarisation states are rotated, e.g., such that each strikes at either side of the director at the same non-zero angle (e.g., 45 degrees).

FIGS. 1 and 2. illustrate two possible ways of implementing a polarization insensitive beam steering system using liquid crystal devices with orthogonally aligned LC directors (either as two LCOS devices, or a single LCOS device with two separate areas having orthogonally aligned LC directors). The idea of using orthogonally aligned LC directors is generally applicable to any liquid crystal device that uses phase modulation, such as blazed gratings, as mentioned later in this specification with reference to a blazed phase profile. The/ each liquid crystal device may comprise a plurality of pixels and/or may be a phase modulation liquid crystal device such as a hologram or a grating, e.g., a blazed grating.

Figure 3:
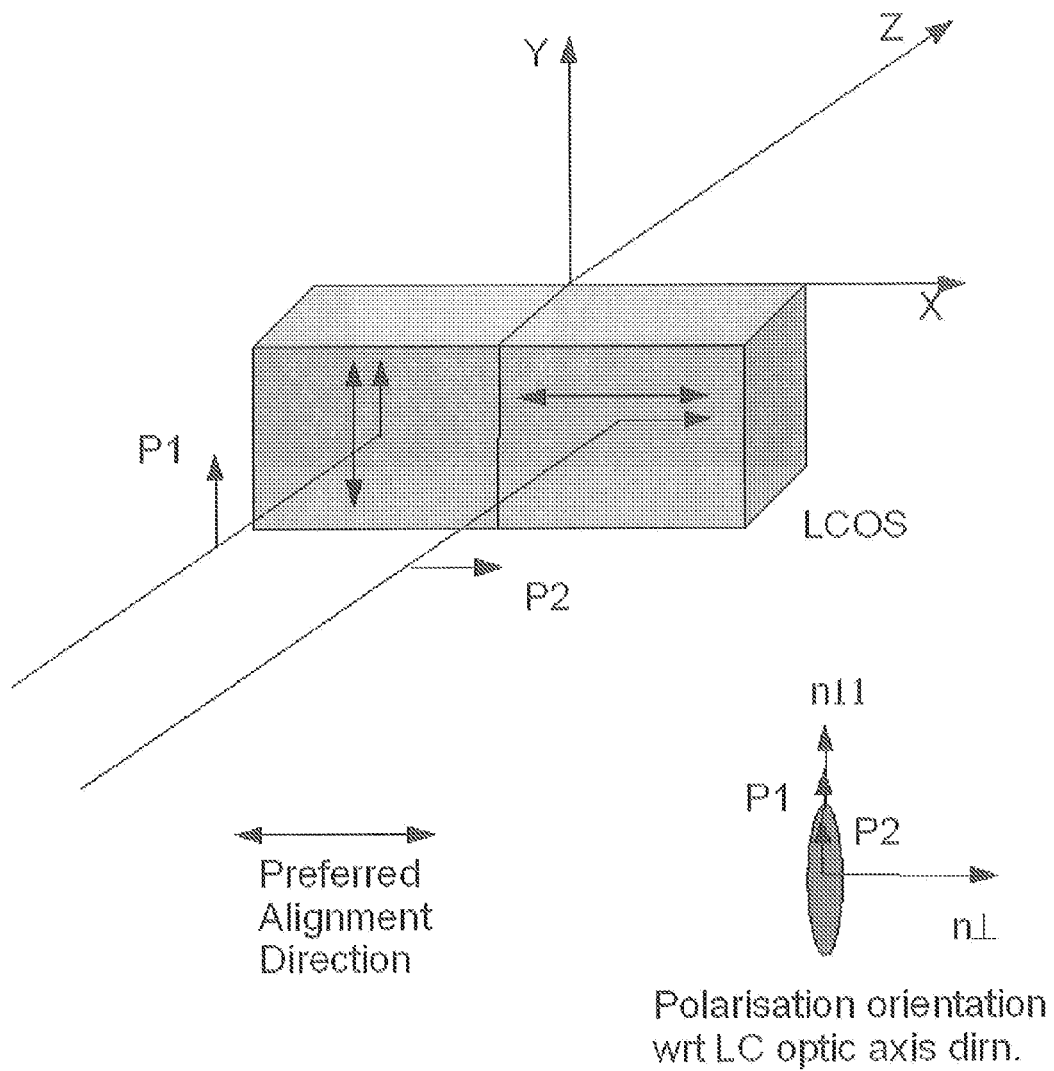
FIG. 3 shows a third embodiment, wherein a single LCOS is split into two regions with orthogonal director orientations.
Figure 4:
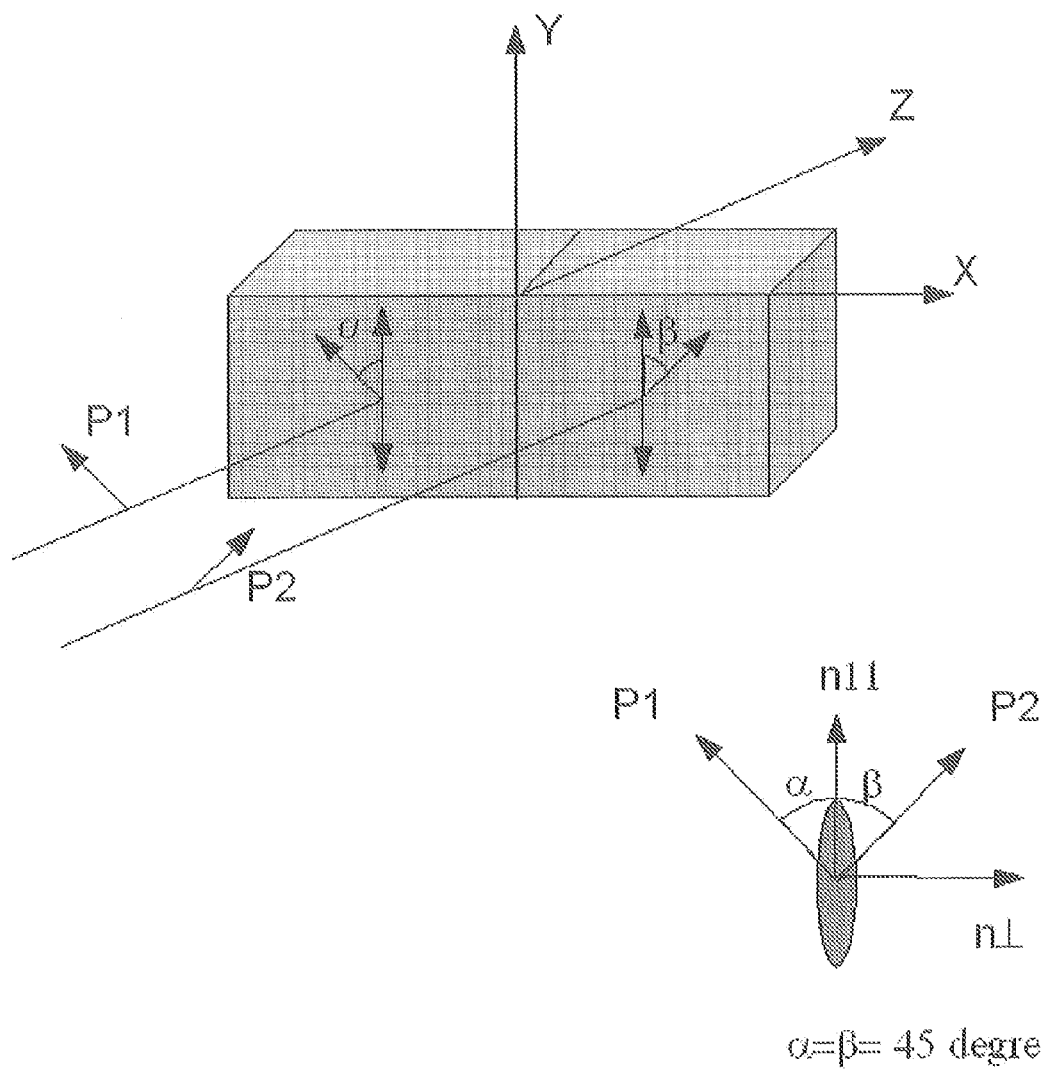
FIG. 4 shows a fourth embodiment, wherein a single LCOS has substantially the same director orientation throughout.

In a third embodiment such as is shown in FIG. 3, orthogonal polarisations are directed to different region, e.g., half, of a single LCOS device. The device may have been treated to have substantially mutually orthogonal alignment for the LC directors of the regions.

For example, the phase of the input light may be modified by the embodiment of FIG. 3 in the following manner:
  (1) The input fibre port directs light through imaging optics such that it forms a planar phase front.
  (2) This phase front passes through a polarising beam splitter such that it is divided into two beams of mutually orthogonal polarisation states.

(3) The beams are directed onto different regions of an LCOS device. The LCOS device contains homogeneously aligned Nematic LC material.
(4) The LCOS device is divided into two regions of equal dimension. The alignment treatment introduced in these two regions acts to ensure that the LC directors are mutually orthogonal i.e. The director in region 1 is orthogonal to the director in region 2. This may be achieved using evaporated SiOx (e.g., $SiO_2$) with suitable masking, for example.
(5) The polarisation states of the two beams incident on the LCOS are mutually orthogonal and are directed to the appropriate half of the LCOS device such that each may 'see' the same phase profile (see FIG. 2). In this way, both beams may see the full potential phase modulation depth of the rotating LC director under the action of an addressing electric field.
(6) If both polarisations 'see' the same phase profile, the device may then be polarisation insensitive.
(7) The LCOS phase profile takes the form of a diffraction grating at its simplest or a holographic array at its most complex. This phase profile is used to steer the light to a selected output port, or to split the light between more than one output ports.
(8) The LCOS device uses the phase profile to deflect the light to a suitable output port.
(9) By the time the beams reach the output port the two polarisation states have been recombined.

In a fourth embodiment such as is shown in FIG. 4, light may be split into two substantially mutually orthogonal polarisation states (P1, P2) and these states may be aligned so that they strike the material at an angle of substantially 45 degrees, for example as described in (b) above. If the polarisation states of the two components lie at the same angle with respect to the liquid crystal director (although opposite in sign), each electric field vector may experience the same potential phase modulation depth. Specifically, for both of the two mutually orthogonal incident polarisation states, this technique may allow only the component of the electric field vector parallel to projection of the director onto the incidence plane to actually see the phase profile. Such an embodiment may have a fixed loss penalty, e.g., 3 dB.

Thus, in the fourth embodiment, the polarisation states of the two beams are advantageously mutually orthogonal and lie at angle of substantially 45 degrees to the liquid crystal director, the angles having an opposite sign to one another. Such an embodiment may allow the device to be polarisation insensitive.

In the fourth embodiment the splitter may split a beam into at least a first part having a first polarisation and a second part having a second polarisation, the first and second polarisations being mutually orthogonal. A first liquid crystal device region having a first director orientation may receive the first part and, similarly, a second liquid crystal device region having a second director orientation may receive the second part. In particular, the first and second director orientations may be substantially aligned. Moreover, the first polarisation may be at a first angle to a plane substantially aligned to said director orientations, and the second polarisation a second angle to that plane. In such a case, the first and second angles may be substantially equal and have opposite signs, e.g., one of the angles being substantially +45 degrees and the other substantially −45 degrees.

Thus, a plane substantially aligned to said first and second director orientations may bisect the included angle defined by the first and second beam parts, to extend the same angle to each of these parts, albeit opposite in sign.

In particular, the phase of the input light may be modified by the fourth embodiment as shown in FIG. 4 in the following manner:
(1) The input fibre port directs light through imaging optics such that it forms a planar phase front.
(2) This phase front passes through a polarising beam splitter such that it is divided into two beams of mutually orthogonal polarisation states.
(3) The beams are directed onto different regions of an LCOS device. The LCOS device contains homogeneously aligned Nematic LC material with a single director orientation throughout. The LCOS device is divided into two regions of equal dimension.
(4) The orientation of the liquid crystal director within the LCOS device and the orientation of the two orthogonal polarisation states emerging from the polarising beam splitter are fixed with respect to one another such that both polarisation state's electric field vectors make the same angle to the optic axis, i.e. 45 degrees.
(5) In this way both beams see the same effective refractive index and the same phase modulation depth of the rotating LC director under the action of an addressing electric field.
(6) Since both polarisations 'see' the same phase profile, the device will be polarisation insensitive (however, this technique carries a fixed 3 dB loss penalty see below).
(7) The LCOS phase profile takes the form of a diffraction grating at its simplest or a holographic array at its most complex. This phase profile is used to steer the light to a selected output port, or to split the light between more than one output ports.
(8) By the time the beams reach the output port the two polarisation states have been recombined.

As described above in relation to the first embodiment, the second to fourth embodiments may similarly not need a quarter wave plate to ensure polarisation insensitivity and hence the speed and resolution of the nematic device may remain optimal. Where only one LCOS is used, costs may be reduced in comparison to a two LCOS approach. Moreover, the optical loss may be low.

Further similarly, in the second to fourth embodiments rubbing alignment, deposition and/or photoalignment may be used to make manufacturing easier.

Any remaining loss penalty of any embodiment of the present invention may be compensated for by the use of an amplification device. Alternatively, any light loss may be used to drop wavelengths, monitor the signals and for other purposes.

To further improve honouring of polarisation in any of the embodiments described herein, one of more further elements may be added in the path of one or both the split beams, the elements having appropriate shape (e.g., rectangular) to ensure that the path lengths are optically matched. Such an element may be for example a glass prism.

Furthermore, in any of the above described embodiments, there may be no physical separation between the beam splitter (e.g., PBS) and the LCOS element(s).

Any of the embodiments described above may be implemented within an Optical Add Drop Multiplexer (OADM), such as a reconfigurable OADM (ROADM). Any such OADM may be scaled to implement an embodiment of the present invention in respective of a plurality of input and output ports, e.g., 40, 60 or 80.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A method of polarisation-independent optical beam steering, the method comprising:
   splitting an optical beam into at least a first part having a first polarisation and a second part having a second polarisation, said first and second polarisations being substantially mutually orthogonal;
   receiving said first part at a first liquid crystal device region comprising a first tunable phase profile, wherein said first liquid crystal device region has a director orientation substantially aligned to said first polarisation; and
   receiving said second part at a second liquid crystal device region comprising a second tunable phase profile, wherein said second liquid crystal device region has a director orientation substantially aligned to said second polarisation;
   wherein said first and second liquid crystal device regions each comprise nematic liquid crystal;
   the method further comprising controlling angles of first order light reflection from said first and second liquid crystal device regions polarisation-independently by means of controlling said first and second tunable phase profiles by applying an electric field to said first and second tunable phase profiles to rotate said directors of said first and second liquid crystal device regions out of the plane of said first and second liquid crystal device regions by switching of said nematic liquid crystal of each of said first and second liquid crystal device regions to control angles of first order light reflection from said first and second liquid crystal device regions, wherein said first tunable phase profile as seen by said first polarisation of said first part is substantially the same as said second tunable phase profile as seen by said second polarisation of said second part.

2. The method of claim 1, wherein said first and second tunable phase profiles comprise first and second tunable blazed gratings, or first and second tunable holographic arrays.

3. The method of claim 1, further comprising combining and steering the controlled reflected light towards at least one selected output port corresponding to said angles of first order light reflection.

4. An optical beam steering apparatus, comprising:
   a splitter arranged to split an optical beam into at least a first part having a first polarisation and a second part having a second polarisation, said first and second polarisations being substantially mutually orthogonal;
   a first liquid crystal device region arranged to receive said first part and to have director orientation substantially aligned to said first polarisation, wherein said first liquid crystal device region comprises a first tunable phase profile; and
   a second liquid crystal device region arranged to receive said second part and to have director orientation substantially aligned to said second polarisation, wherein said second liquid crystal device region comprises a second tunable phase profile;
   wherein said first and second liquid crystal device regions each comprise nematic liquid crystal; and
   wherein said apparatus is arranged to allow polarisation-independent control of angles of first order light reflection from said first and second liquid crystal device regions by controlling said first and second tunable phase profiles by applying an electric field to said first and second tunable phase profiles to rotate said directors of said first and second regions out of the plane of said first and second liquid crystal device regions to control angles of first order light reflection from said first and second liquid crystal device regions, wherein said first tunable phase profile as seen by said first polarisation of said first part is substantially the same as said second tunable phase profile as seen by said second polarisation of said second part.

5. The apparatus of claim 4, wherein said first and second tunable phase profiles comprise first and second tunable blazed gratings, or first and second tunable holographic arrays.

6. The apparatus of claim 4, further comprising at least one wide aperture optical circulator, said circulator being arranged to transmit light to said splitter and to receive light from said splitter.

7. An optical add drop multiplexer comprising the optical beam steering apparatus of claim 4.

* * * * *